(12) United States Patent
Barlas et al.

(10) Patent No.: US 11,268,495 B2
(45) Date of Patent: Mar. 8, 2022

(54) WIND FARM NOISE PREDICTION METHOD, APPARATUS AND SYSTEM

(71) Applicant: BEIJING GOLDWIND SCIENCE & CREATION WINDPOWER EQUIPMENT CO., LTD., Beijing (CN)

(72) Inventors: Emre Barlas, Beijing (CN); Mengting Yu, Beijing (CN)

(73) Assignee: BEIJING GOLD WIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/968,158

(22) PCT Filed: Sep. 16, 2019

(86) PCT No.: PCT/CN2019/105949
§ 371 (c)(1),
(2) Date: Aug. 7, 2020

(87) PCT Pub. No.: WO2020/088128
PCT Pub. Date: May 7, 2020

(65) Prior Publication Data
US 2020/0362818 A1 Nov. 19, 2020

(30) Foreign Application Priority Data
Oct. 31, 2018 (CN) .......................... 201811290818.6

(51) Int. Cl.
*F03D 7/02* (2006.01)
*F03D 17/00* (2016.01)
*F03D 7/04* (2006.01)

(52) U.S. Cl.
CPC .......... *F03D 7/0296* (2013.01); *F03D 7/0276* (2013.01); *F03D 7/048* (2013.01);
(Continued)

(58) Field of Classification Search
CPC ...... F03D 7/0296; F03D 7/0276; F03D 7/048; F03D 17/00; F05B 2260/71; F05B 2260/821; F05B 2260/96; F05B 2270/333
See application file for complete search history.

(56) References Cited

U.S. PATENT DOCUMENTS

2015/0308416 A1 10/2015 Ambekar et al.
2016/0032892 A1* 2/2016 Herrig ................... F03D 7/0296
416/1
(Continued)

FOREIGN PATENT DOCUMENTS

CN 103823979 A 5/2014
CN 106873359 A 6/2017
(Continued)

OTHER PUBLICATIONS

European Search Report from corresponding European Application No. 19880784.4 dated Mar. 15, 2021 (8 pages).
(Continued)

*Primary Examiner* — Sean Gugger
(74) *Attorney, Agent, or Firm* — Bayes PLLC

(57) ABSTRACT

Provided are a wind farm noise prediction method, apparatus and system. The method comprises: collecting, in real time, a wind speed at a site of at least one wind turbine generator system, which impacts noise at a noise detection point, in a wind farm; according to a noise acoustic power level database and a system database, respectively calculating a noise acoustic power level, at the collected wind speed, of each wind turbine generator system from among the at least one wind turbine generator system; according to a wind farm noise propagation database, respectively calculating a noise propagation loss value, at the collected wind speed, of each wind turbine generator system; and using the noise acoustic power level and the noise propagation loss value of each wind turbine generator system to calculate a total noise acoustic pressure level at the noise detection point.

20 Claims, 5 Drawing Sheets

(52) U.S. Cl.
CPC .......... *F03D 17/00* (2016.05); *F05B 2260/71* (2013.01); *F05B 2260/821* (2013.01); *F05B 2260/96* (2013.01); *F05B 2270/333* (2013.01)

(56) References Cited

U.S. PATENT DOCUMENTS

2017/0356421 A1   12/2017  Petitjean et al.
2020/0182224 A1*  6/2020   Gupta .................. F03D 7/0296

FOREIGN PATENT DOCUMENTS

| KR | 20130073410 A | 7/2013 |
|----|---------------|--------|
| WO | 2018046068 A1 | 3/2018 |

OTHER PUBLICATIONS

International Search Report and Written Opinion issued in corresponding PCT Application No. PCT/CN2019/105949, dated Dec. 13, 2019, 8 pages.

* cited by examiner

WIND FARM NOISE PREDICTION METHOD, APPARATUS AND SYSTEM

CROSS-REFERENCE TO RELATED APPLICATIONS

This application is a US national phase of International Application No. PCT/CN2019/105949, filed on Sep. 16, 2019, which claims priority to Chinese Patent Application No. 201811290818.6, filed on Oct. 31, 2018. The entire contents of each of the above-identified applications are incorporated herein by reference.

TECHNICAL FIELD

The present disclosure relates to the technical field of wind power generation, and particularly, to a method, a device and a system for noise prediction of a wind farm.

BACKGROUND

When a wind turbine runs at high speed to generate electricity, operation of components such as a fan blade and a generator of the wind turbine brings inevitable noise. At present, with rapid development of wind power generation, the number of wind farms is increasing, and locations of built wind farms are getting closer and closer to people's daily life and work areas. Wind farm noise causes noise pollution that cannot be ignored, and brings serious negative impacts on a surrounding environment, especially causing people's annoyance or affecting people's health.

An optimization plan at a wind farm level is required in existing methods for controlling wind farms noises, to calculate a noise reduction command value to be executed by each wind turbine in order to make the whole farm in an optimal operating status. However, there are few technologies that can achieve the noise control at the wind farm level currently, and no consideration is given to power generation loss of the whole farm caused by a noise control requirement of the wind farm.

SUMMARY

According to an aspect of the present disclosure, a method for noise prediction of a wind farm is provided, which includes the following steps: collecting, in a real-time manner, a wind speed at a location of at least one wind turbine in the wind farm, where the at least one wind turbine has an impact on noise at a noise detection point; calculating a noise sound power level of each wind turbine in the at least one wind turbine at the collected wind speed according to a noise sound power level database and a wind turbine database; calculating a value of noise propagation loss of each of the at least one wind turbine at the collected wind speed according to a wind farm noise propagation database; and calculating a total noise sound pressure level at the noise detection point by using the noise sound power level and the value of noise propagation loss of all the at least one wind turbine.

The noise sound power level database and the wind turbine database are built based on noise sound power level data and output power data of a wind turbine of the same type as each of the at least one wind turbine at different wind speeds and different rotation speeds. The noise sound power level database includes data of wind speed, rotation speed and noise sound power level, and the wind turbine database includes a first database including data of wind speed, maximum rotation speed and minimum rotation speed and a second database including data of wind speed, rotation speed and output power.

The wind farm noise propagation database is built according to a result of simulation of noise propagation processes of the wind farm. The wind farm noise propagation database includes data of distance, angle and value of noise propagation loss.

According to another aspect of the present disclosure, a device for noise prediction of a wind farm is provided, which includes: a data collection module configured to collect, in a real-time manner, a wind speed at a location of at least one wind turbine in the wind farm, where the at least one wind turbine has an impact on noise at a noise detection point; and a data calculation module configured to: calculate a noise sound power level of each wind turbine in the at least one wind turbine at the collected wind speed according to a noise sound power level database and a wind turbine database; calculate a value of noise propagation loss of each of the at least one wind turbine at the collected wind speed according to a wind farm noise propagation database; and calculate a total noise sound pressure level at the noise detection point by using the noise sound power level and the value of noise propagation loss of all the at least one wind turbine.

According to another aspect of the present disclosure, a system for noise prediction of a wind farm is provided, which includes: a memory, configured to store a wind speed collected in a real-time manner at a location of at least one wind turbine in the wind farm, a noise sound power level database and a wind turbine database, where the at least one wind turbine has an impact on noise at a noise detection point; and a wind farm controller, configured to: calculate a noise sound power level of each wind turbine in the at least one wind turbine at the collected wind speed according to the noise sound power level database and the wind turbine database; calculate a value of noise propagation loss of each of the at least one wind turbine at the collected wind speed according to a wind farm noise propagation database; and calculate a total noise sound pressure level at the noise detection point by using the noise sound power level and the value of noise propagation loss of all the at least one wind turbine.

According to an aspect of the present disclosure, a computer readable storage medium with a program stored thereon is provided, where the program includes instructions for performing the above method for noise prediction of a wind farm.

According to an aspect of the present disclosure, a computer is provided, which includes a processor and a memory, where instructions are stored on the memory, the instructions, when being executed by the processor, causing the processor to perform the above method for noise prediction of a wind farm.

DETAILED DESCRIPTION OF EMBODIMENTS

Figure 1:
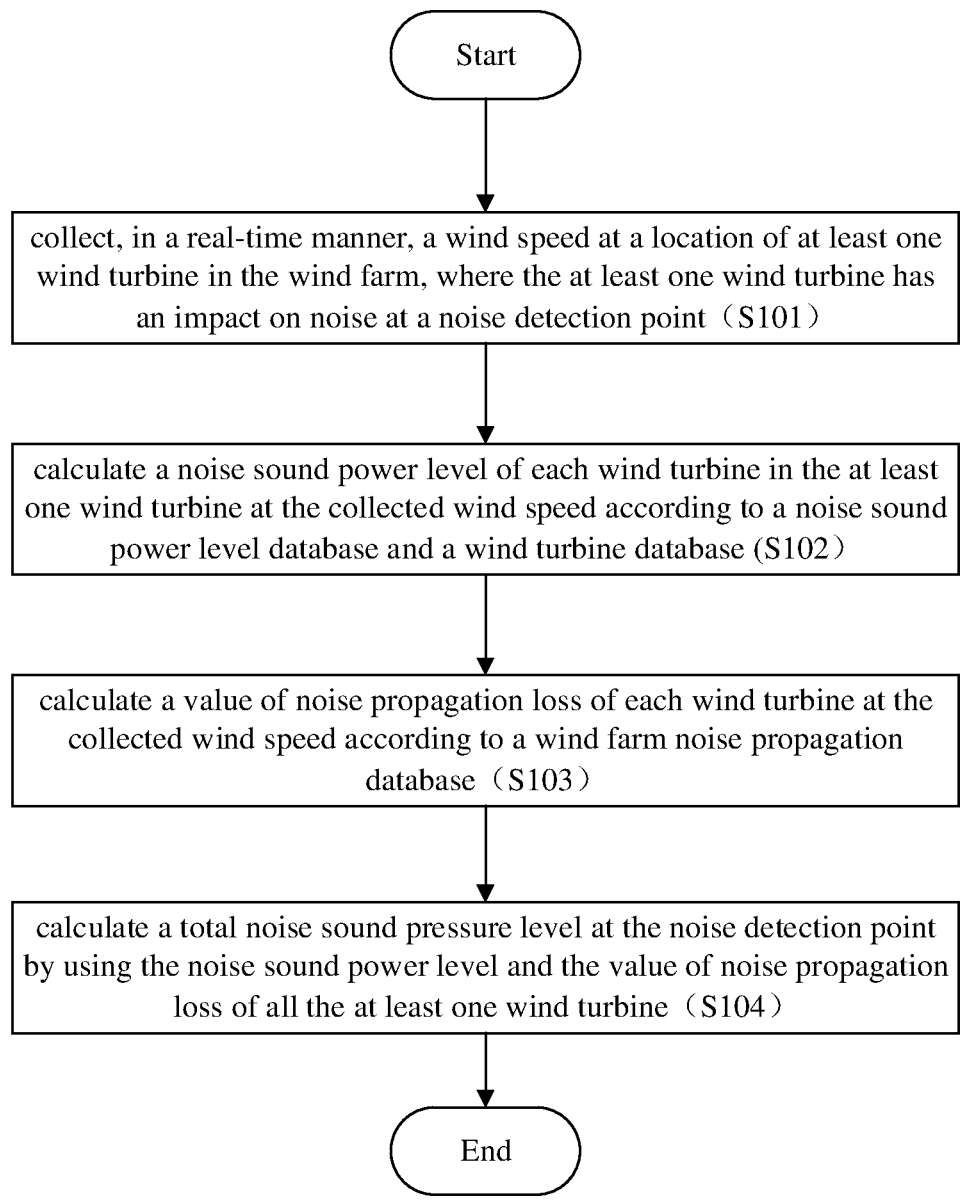
FIG. 1 illustrates a schematic flow chart of a method for noise prediction of a wind farm according to an embodiment of the present disclosure.

A detailed reference is made to the exemplary embodiments of the present disclosure, and examples of the embodiments are shown in the drawings, where the same label always indicates the same component. The embodiments will be described in conjunction with the drawings in order to explain the present disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

In the present disclosure, terms including ordinal numbers such as "first", "second", may be used to describe various elements, but these elements should not be understood as being limited to these terms. These terms are only used to distinguish one element from other elements. For example, a first element may be referred to as a second element, and vice versa, without departing from the scope of this disclosure.

FIG. 1 illustrates a schematic flow chart of a method for noise prediction of a wind farm according to an embodiment of the present disclosure.

As illustrated in FIG. 1, in step S101, a wind speed at a location of at least one wind turbine in the wind farm is collected in a real-time manner, where the at least one wind turbine has an impact on noise at a noise detection point. At least one wind turbine in the wind farm, which has an impact on the noise detection point, is selected in a preliminary preparation process for predicting a noise level of the wind farm, and the selected at least one wind turbine is used to predict the noise level of the wind farm. When predicting the noise level of the wind farm, the wind speed at the location of the selected wind turbine is collected in real time.

In step S102, a noise sound power level of each of the selected at least one wind turbine at the collected wind speed is calculated according to a noise sound power level database and a wind turbine database. In an embodiment of the present disclosure, the noise sound power level database and the wind turbine database can be built based on noise sound power level data and output power data of a wind turbine of the same type as the selected at least one wind turbine at different wind speeds and different rotation speeds, respectively. The noise sound power level database according to the present disclosure includes wind speed data, rotation speed data, and noise sound power level data. As illustrated in Table 1, Rot Speed represents a rotation speed in rpm of a wind turbine at a corresponding wind speed; Wind Speed represents a wind speed in m/s at the location of the wind turbine; LW represents a noise sound power level in dB of the wind turbine.

TABLE 1

| Rot Speed & LW | Rot Speed | | | |
|---|---|---|---|---|
| | 6.95 | 8.19 | 9.4 | 10.69 |
| Wind speed | | | | |
| 3 | 6.95 | 8.19 | 9.4 | 10.69 |
| 5 | 95 | 99 | 1000 | 1000 |
| 7 | 95 | 99 | 1000 | 1000 |
| 9 | 95 | 99 | 101 | 1000 |
| 11 | 95 | 99 | 101 | 1000 |
| 13 | 1000 | 99 | 101 | 105 |
| 15 | 1000 | 99 | 101 | 105 |
| 17 | 1000 | 99 | 101 | 105 |
| 19 | 1000 | 99 | 101 | 105 |
| 21 | 1000 | 1000 | 101 | 105 |
| 23 | 1000 | 1000 | 101 | 105 |
| 25 | 1000 | 1000 | 101 | 105 |

In an embodiment of the present disclosure, the wind turbine database includes a first database including wind speed data, maximum rotation speed data, and minimum rotation speed data. Table 2 below illustrates the first database including data of wind speed, maximum rotation speed, and minimum rotation speed. In Table 2, Wind speed represents a wind speed in m/s at the location of a wind turbine, Min Rot Speed represents a minimum rotation speed in rpm of the wind turbine at a wind speed, and Max Rot Speed represents a maximum rotation speed in rpm of the wind turbine at a corresponding wind speed.

TABLE 2

| Wind speed | Min Rot Speed | Max Rot Speed |
|---|---|---|
| 0 | 0 | 0 |
| 3 | 6.95 | 8.19 |
| 5 | 6.95 | 8.19 |
| 7 | 6.95 | 9.4 |
| 9 | 6.95 | 9.4 |
| 11 | 8.19 | 10.69 |
| 13 | 8.19 | 10.69 |
| 15 | 8.19 | 10.69 |
| 17 | 8.19 | 10.69 |
| 19 | 9.4 | 10.69 |
| 21 | 9.4 | 10.69 |
| 23 | 9.4 | 10.69 |
| 25 | 9.4 | 10.69 |

After obtaining the noise sound power level database and the wind turbine database, a maximum rotation speed of each wind turbine in the selected at least one wind turbine at a corresponding wind speed can be calculated based on the collected wind speed by a linear interpolation method. Since the data in the built wind turbine database are all discrete data, a two-dimensional linear interpolation method is used to calculate a maximum rotation speed of a selected wind turbine at a corresponding wind speed. For example, the collected wind speed of a wind turbine is 4 m/s. It can be seen from Table 2 that when the wind speed is 3 m/s, the maximum rotation speed is 8.19 rpm, and when the wind speed is 5 m/s, the maximum rotation speed is 8.19 rpm. By the two-dimensional linear interpolation algorithm, the maximum rotation speed at the wind speed of 4 m/s can be calculated to be 8.19 rpm.

After calculating the maximum rotation speed at the wind speed collected in real time, the noise sound power level of each wind turbine at a corresponding wind speed can be calculated by the linear interpolation method according to the noise sound power level database (that is, Table 1). For example, when the wind speed of a wind turbine collected in real time is 4 m/s, and the maximum rotation speed at this wind speed is 8.19 rpm. The noise sound power level of the wind turbine at a corresponding wind speed and a corresponding rotation speed can be calculated using the two-dimensional linear interpolation method according to Table 1.

In step S103, a value of noise propagation loss of the at least one wind turbine at the collected wind speed is calculated according to a wind farm noise propagation database. In an embodiment of the present disclosure, the wind farm noise propagation database needs to be built. Specifically, a model of the wind farm that is expected to be predicted is built by wind power simulation software (e.g., windpro) at first. The model of the wind farm includes an environmental parameter, a terrain model, and a wind turbine model in an area of the wind farm. Then, the built model of the wind farm is used to simulate a process of noise propagation of the wind farm, a result of the simulation is analyzed, and an offline wind farm noise propagation database is derived. The wind farm noise propagation database of the present disclosure may include distance data between a wind turbine and the noise detection point, angle data between the wind turbine and the noise detection point, and data of value of noise propagation loss, as illustrated in Table 3 below. In Table 3, LW-L represents the value of noise propagation loss in dB; D represents a distance between the wind turbine and the noise detection point, and angle represents an angle between the wind turbine and the noise detection point. The angle in Table 3 is an angle between a wind direction and a line connecting the wind turbine and the noise detection point.

TABLE 3

| LW-L | D | | | |
|---|---|---|---|---|
| | 1 | 2 | ... | 2000 |
| angle | | | | |
| 0 | −2 | −4 | ... | −10 |
| 10 | −3 | −6 | ... | −14 |
| ... | ... | ... | ... | ... |
| 350 | −2 | −4 | ... | −10 |

In the calculation of the value of noise propagation loss of the selected at least one wind turbine at a corresponding collected wind speed, location information of each wind turbine in the selected wind turbine and the noise detection point can be obtained, that is, a geographic location of the wind turbine and a geographic location of the noise detection point can be obtained, which can be represented by WTi (x, y) and R (x, y), respectively, where i represents a i-th wind turbine in the selected at least one wind turbine, x represents longitude, and y represents latitude. A straight-line distance between the wind turbine and the noise detection point is calculated according to the obtained location information of the wind turbine and the noise detection point. D(i) can be used to represent the straight-line distance between the i-th wind turbine and the noise detection point.

An angle between each wind turbine and the noise detection point can be calculated according to the obtained location information and a wind direction collected in real time at the location of each wind turbine. Taking a wind turbine as an example, an included angle formed by a collected wind direction of the wind turbine and a line connecting the wind turbine and the noise detection point is determined as the angle between the wind turbine and the noise detection point.

After calculating the straight-line distance and the angle between the wind turbine and the noise detection point, the value of noise propagation loss of each selected wind turbine at a corresponding collected wind speed can be calculated by the linear interpolation method according to the wind farm noise propagation database (as illustrated in Table 3). For example, the same two-dimensional linear interpolation method as that used to calculate the noise sound power level can be used to calculate the value of noise propagation loss of the wind turbine in the wind farm.

In step S104, a total noise sound pressure level at the noise detection point is calculated by using the noise sound power level and the value of noise propagation loss of the selected at least one wind turbine. Specifically, after obtaining the noise sound power level and the value of noise propagation loss of each wind turbine in the selected at least one wind turbine at a corresponding wind speed, a noise sound pressure level of each wind turbine is calculated by using the noise sound power level and the value of noise propagation loss of each wind turbine. The noise sound pressure level of the wind turbine can be calculated according to equation (1).

$$SPL(i)=SPL\_Source(i)-SPL\_Loss(i) \quad (1).$$

In equation (1), SPL(i) represents a noise sound pressure level of the i-th wind turbine at the noise detection point, SPL_Source(i) represents a noise sound power level of the i-th wind turbine, and SPL_Loss(i) represents a value of noise propagation loss of the i-th wind turbine in the wind farm.

After calculating the noise sound pressure level of each selected wind turbine, the calculated noise pressure level of all the at least one wind turbine at the noise detection point are superimposed to calculate the total noise sound pressure level at the noise detection point. Specifically, the total noise sound pressure level can be calculated according to equation (2).

$$Lp=10\ \log_{10}(10^{SPL(1)/10}+10^{SPL(2)/10}\pm \ldots +10^{SPL(i)/10}) \quad (2).$$

In equation (2), Lp represents the total noise sound pressure level, SPL(1) represents a noise sound pressure level of a first wind turbine at the noise detection point, SPL(2) represents a noise sound pressure level of a second wind turbine at the noise detection point, and SPL(i) represents a noise sound pressure level of the i-th wind turbine at the noise detection point.

Figure 2:
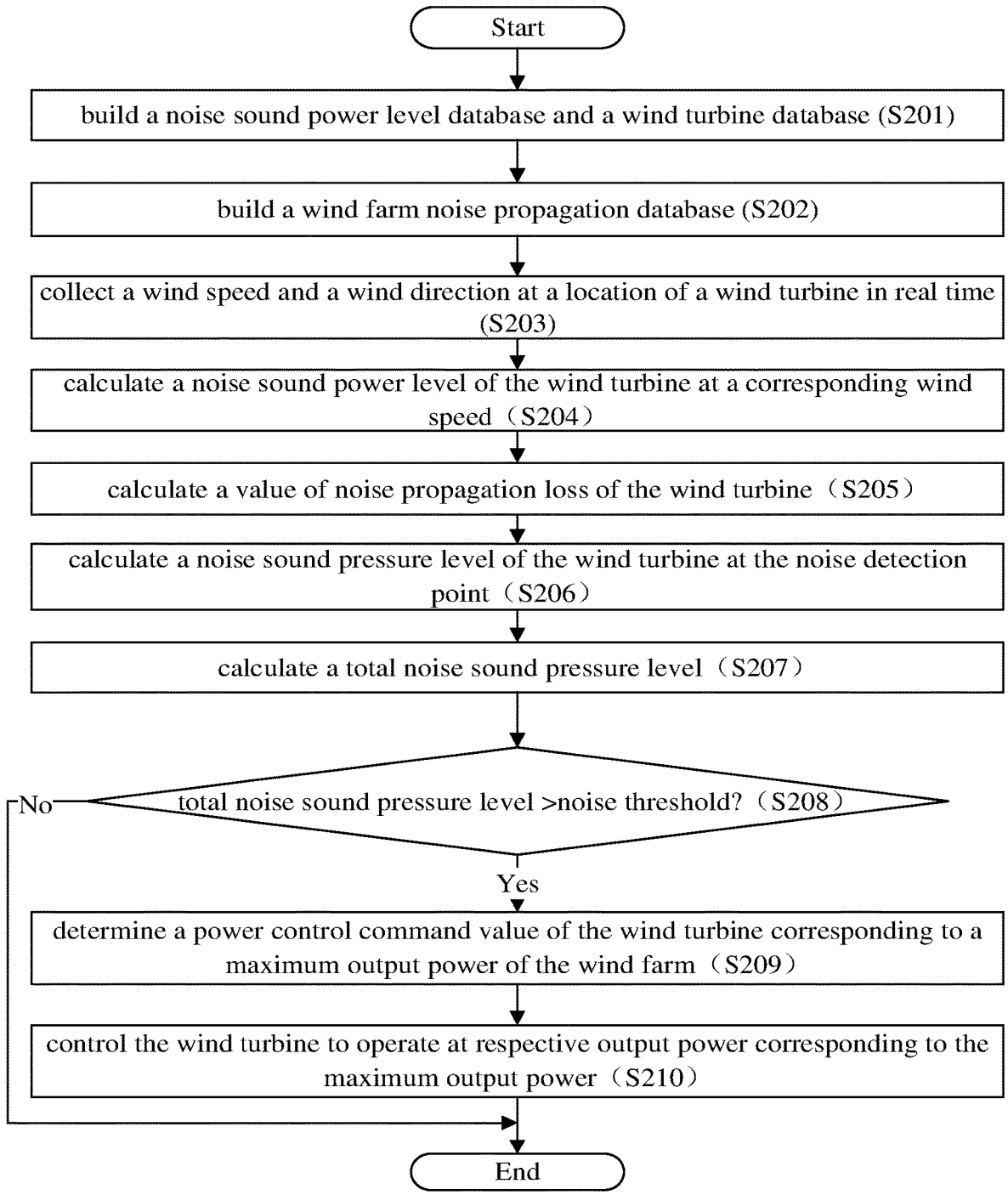
FIG. 2 illustrates a schematic flow chart of a method for noise prediction of a wind farm according to another embodiment of the present disclosure.

FIG. 2 illustrates a schematic flow chart of a method for noise prediction of a wind farm according to another embodiment of the present disclosure.

As illustrated in FIG. 2, in step S201, a noise sound power level database and a wind turbine database are built. According to the embodiment of the present disclosure, before predicting a noise pressure level of a wind farm, at least one wind turbine in the wind farm, which significantly affects noise at a noise detection point, is selected, and then a noise sound power level database and a wind turbine database are built based on noise sound power level data and output power data of a wind turbine of the same type as the at least one wind turbine at different wind speeds and different rotation speeds. The built noise sound power level database includes data of wind speed, rotation speed, and noise sound power level, as illustrated in Table 1. The built wind turbine database includes a first database including data of wind speed, maximum rotation speed and minimum rotation speed, and a second database including data of wind speed, rotation speed and output power. The first database can be represented by Table 2. Table 4 below illustrates the second database including the data of wind speed, rotation speed and output power. In Table 4, Wind speed represents a wind speed in m/s at a location of a wind turbine, Rot Speed represents a rotation speed in rpm of the wind turbine at a corresponding wind speed; P represents output power in MW of the wind turbine at a corresponding wind speed.

TABLE 4

| Rot Speed & | Rot Speed | | | |
|---|---|---|---|---|
| P | 6.95 | 8.19 | 9.4 | 10.69 |
| Wind speed | | | | |
| 3 | 101 | 107 | 0 | 0 |
| 5 | 303 | 321 | 0 | 0 |
| 7 | 820 | 875 | 974 | 0 |
| 9 | 1412 | 1606 | 1767 | 0 |
| 11 | 0 | 1823 | 2076 | 2654 |
| 13 | 0 | 1843 | 2106 | 2702 |
| 15 | 0 | 1845 | 2107 | 2705 |
| 17 | 0 | 1846 | 2108 | 2705 |
| 19 | 0 | 0 | 2109 | 2705 |
| 21 | 0 | 0 | 2110 | 2705 |
| 23 | 0 | 0 | 2110 | 2705 |
| 25 | 0 | 0 | 2110 | 2705 |

In step S202, a wind farm noise propagation database is built. For example, a model of a wind farm that is expected to be predicted can be built by simulation software (e.g., windpro). The built model of the wind farm is used to simulate a process of noise propagation of the wind farm, and the wind farm noise propagation database is built based on a result of the simulation. The wind farm noise propagation database can be represented by Table 3. It should be noted that the Tables 1, 2, 3, and 4 are only exemplary and do not limit the present disclosure.

In step S203, a wind speed and a wind direction at a location of the at least one wind turbine in the wind farm are collected in a real-time manner, where the at least one wind turbine has a significant impact on noise at the noise detection point. For example, in a case that three wind turbines that significantly affect noise at the noise detection point are selected, wind speeds and wind directions at locations of the three wind turbines need to be collected in real time.

In step S204, a noise sound power level of the selected at least one wind turbine at the wind speed collected in a real-time manner is calculated. Specifically, a maximum rotation speed of each wind turbine in the selected at least one wind turbine at a corresponding wind speed is calculated by a linear interpolation method according to the first database and the collected wind speed; and the noise sound power level of each selected wind turbine at the corresponding wind speed is calculated by a linear interpolation method according to the calculated maximum rotation speed and the noise sound power level database. Take one wind turbine as an example, after collecting a wind speed at a location of the wind turbine, a maximum rotation speed of the wind turbine at this wind speed is calculated by a two-dimensional linear interpolation method by using the wind speed in combination with the first database, and a noise sound power level of the wind turbine is calculated by the two-dimensional linear interpolation method by using the calculated maximum rotation speed and the collected wind speed in combination with the noise sound power level database.

In step S205, a value of noise propagation loss of the selected at least one wind turbine at the wind speed collected in a real-time manner is calculated. For example, location information of each wind turbine in the selected at least one wind turbine and the noise detection point is obtained; a straight-line distance between each wind turbine and the noise detection point is calculated according to the obtained location information; an angle between each wind turbine and the noise detection point is calculated according to the obtained location information and a wind direction collected in real time at the location of each wind turbine; and the value of noise propagation loss of each wind turbine at a corresponding wind speed is calculated by the linear interpolation method according to the wind farm noise propagation database, the calculated straight-line distance and the calculated angle.

In step S206, a noise sound pressure level of each selected wind turbine at the noise detection point is calculated. For example, for each selected wind turbine, the noise sound pressure level of each wind turbine can be calculated by the equation (1).

In step S207, a total noise sound pressure level at the noise detection point is calculated. After obtaining the noise sound pressure level of each selected wind turbine at the noise detection point, the total noise sound pressure level can be calculated by the equation (2).

After predicting the total noise sound pressure level, in step S208, the calculated total noise sound pressure level is compared with a noise threshold at the noise detection point to determine whether to optimize control of the selected at least one wind turbine. In a case that the calculated total noise sound pressure level is less than or equal to the noise threshold, indicating that noise generated by wind turbines in the wind farm is within an allowable range, the wind turbines continues to operate at a current speed. In a case that the calculated total noise sound pressure level is greater than the set noise threshold, the method proceeds to step S209.

In step S209, output power of each wind turbine in the selected wind turbine at a respective wind speed collected in a real-time manner is calculated based on the wind turbine database, and a power control command value of each wind turbine, which causes the total noise sound pressure level to be less than or equal to the noise threshold and output power of the whole wind farm to be maximum, is determined based on the calculated output power of each wind turbine by using an optimization algorithm. Specifically, the maximum rotation speed of the wind turbine can be calculated by the two-dimensional linear interpolation method based on the wind speed collected in a real-time manner and the first database (i.e., Table 2), and then the output power of the wind turbine at a corresponding wind speed is calculated by the two-dimensional linear interpolation method by using the calculated maximum rotation speed and the corresponding wind speed combined with the second database (i.e., Table 4). The calculated output power of each wind turbine is input as an initial value into the optimization algorithm, to find, by the optimization algorithm, a control solution by which the total noise sound pressure level does not exceed a limit (that is, less than or equal to the noise threshold) and the output power of the whole wind farm reaches the maximum.

In the present disclosure, the input and the output of the optimization algorithm are set according to characteristics of noise prediction and optimization. For example, the noise limit (i.e., the total noise sound pressure level is less than or equal to the noise threshold) is used as a constraint, and the power control command value of the selected wind turbine, which leads to the maximum power generation in the whole wind farm under the constraint, is found. The optimization algorithm of the present disclosure may be particle swarm optimization or a genetic algorithm for implementing the above optimization process.

In step S210, operation of each wind turbine is controlled based on the power control command value of the wind turbine corresponding to the maximum output power of the whole farm. Specifically, the power control command value of the selected wind turbine obtained in step S209 is sent to a controller of a corresponding wind turbine, so that the selected wind turbine operates according to the corresponding power control command value, that is, the wind turbine generates electricity at the output power of the wind turbine obtained by the optimization algorithm.

A purpose of the optimization algorithm of the present disclosure is to find, under the condition that the noise limit is met, a solution with a minimum output power loss of the wind turbine that has a significant impact on the noise detection point. Since a wind turbine that does not affect the noise detection point is performing maximum wind energy capture, the solution with the minimum output power loss is only required by the wind turbine that has a significant impact on the noise detection point, so as to ensure the maximum generating capacity of the whole farm.

Figure 3:
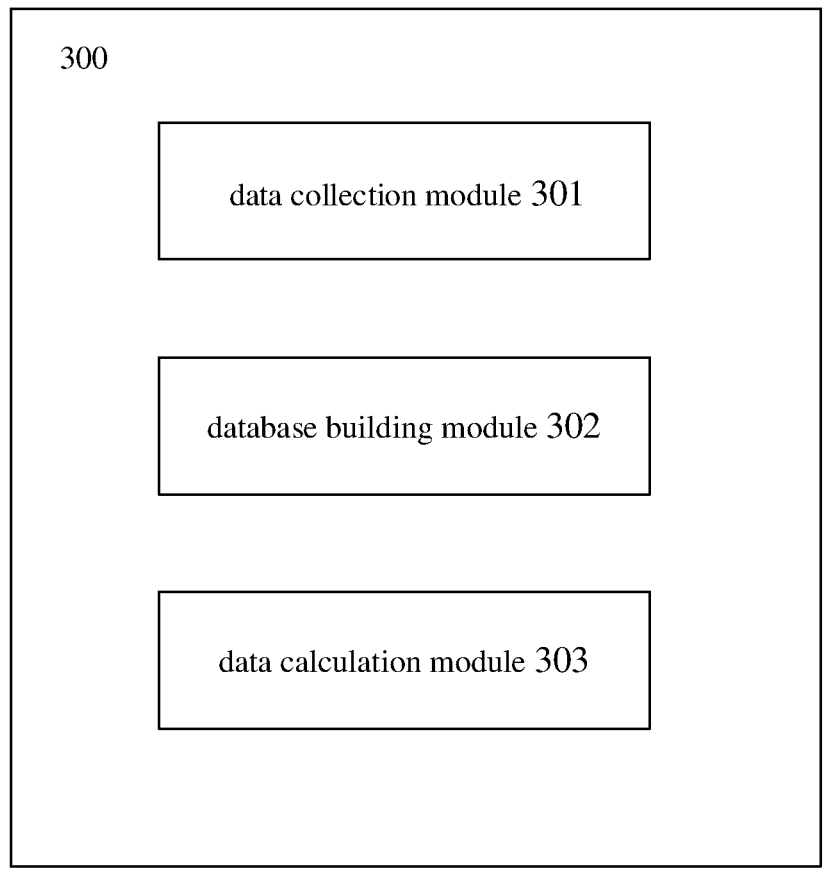
FIG. 3 illustrates a block diagram of a device for noise prediction of a wind farm according to an embodiment of the present disclosure.

FIG. 3 illustrates a block diagram of a device for noise prediction of a wind farm according to an embodiment of the present disclosure.

As illustrated in FIG. 3, the device 300 for noise prediction of a wind farm includes: a data collection module 301, a database building module 302, and a data calculation module 303. Each module in the device 300 according to the present disclosure may be implemented by one or more modules, and a name of the corresponding module may vary according to a type of the device. In various embodiments, some modules in the device 300 may be omitted, or additional modules may be included. In addition, the modules according to the various embodiments of the present disclosure may be combined to form a single entity, and thus functions of the corresponding modules before combination may be equivalently performed.

The data collection module 301 collects, in a real-time manner, a wind speed at a location of at least one wind turbine in the wind farm, where the at least one wind turbine has an impact on noise at a noise detection point. At least one wind turbine in the wind farm, which has an impact on the noise detection point, is selected in a preliminary preparation process for predicting a noise level of the wind farm, and the selected at least one wind turbine is used to predict the noise level of the wind farm.

The database building module 302 may build a noise sound power level database and a wind turbine database based on noise sound power level data and output power data of a wind turbine of the same type as the at least one wind turbine at different wind speeds and different rotation speeds. The noise sound power level database includes data of wind speed, rotation speed and noise sound power level, as illustrated in Table 1. The wind turbine database includes a first database including data of wind speed, maximum rotation speed and minimum rotation speed (as illustrated in Table 2) and a second database including data of wind speed, he rotation speed and output power (as illustrated in Table 4).

The database building module 302 may also build a wind farm noise propagation database based on a simulation result of simulating a process of noise propagation of the wind farm. The wind farm noise propagation database includes data of distance, angle and value of noise propagation loss. Specifically, a model of the wind farm that is expected to be predicted is first built by simulation software, for example, the model of the wind farm may be built with windpro. Then, the built model of the wind farm is used to simulate the process of noise propagation of the wind farm. The database building module 302 may build the wind farm noise propagation database based on the simulation result, as illustrated in Table 3.

The data calculation module 303 may calculate a maximum rotation speed of each wind turbine at a corresponding wind speed by a linear interpolation method according to the first database and the collected wind speed; and calculate a noise sound power level of each wind turbine at the corresponding wind speed by a linear interpolation method according to the calculated maximum rotation speed and the noise sound power level database.

The data collection module 301 may further obtain location information of each selected wind turbine and the noise detection point, and collect a wind direction at the location of each wind turbine in real time. The data calculation module 303 may calculate a straight-line distance between each wind turbine and the noise detection point according to the obtained location information, calculate an angle between each wind turbine and the noise detection point according to the obtained location information and the collected wind direction, and calculate a value of noise propagation loss of each wind turbine at a corresponding wind speed by a linear interpolation method according to the wind farm noise propagation database, the calculated straight-line distance and the calculated angle.

After obtaining the noise sound power level and the value of noise propagation loss of each wind turbine, the data calculation module 303 may calculate, according to equation (1), a noise sound pressure level of each wind turbine at the noise detection point based on the noise sound power level and the value of noise propagation loss of each selected wind turbine, and calculate the total noise sound pressure level at the noise detection point by superimposing, according to equation (2), the calculated noise pressure level of all the at least one wind turbine at the noise detection point.

Figure 4:
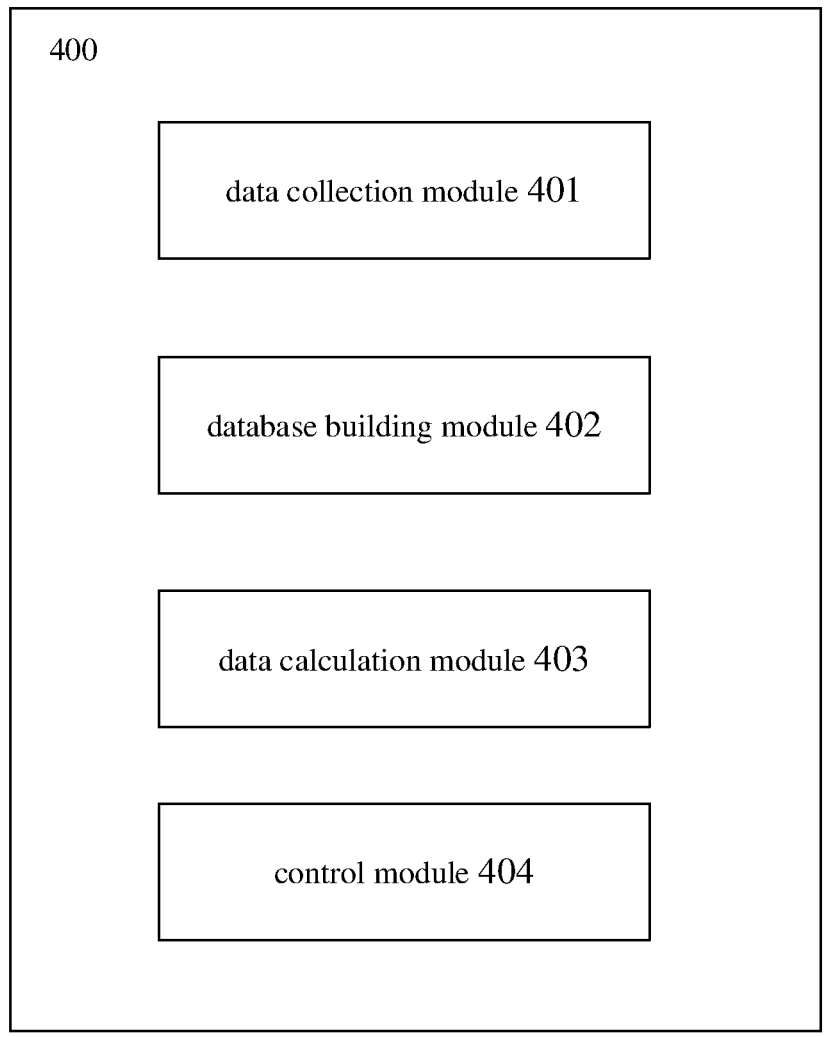
FIG. 4 illustrates a block diagram of a device for noise prediction of a wind farm according to another embodiment of the present disclosure.

FIG. 4 illustrates a block diagram of a device for noise prediction of a wind farm according to another embodiment of the present disclosure.

As illustrated in FIG. 4, the device 400 for noise prediction of a wind farm includes: a data collection module 401, a database building module 402, a data calculation module 403, and a control module 404. Functions implemented by the data collection module 401, the database building module 402, and the data calculation module 403 are the same with those of the data collection module 301, the database building module 302, and the data calculation module 303, which are not repeated here.

The control module 404 may control output power of each wind turbine according to the calculated total noise sound pressure level at the noise detection point, so that output power of whole wind farm reaches maximum under the condition that the total noise sound pressure level does not exceed a noise threshold. Specifically, the control module 404 may compare the calculated total noise sound pressure level with the noise threshold at the noise detection point. In a case that the total noise sound pressure level is greater than the noise threshold, the control module 404 calculates output power of each wind turbine at the collected wind speed based on the wind turbine database, determines a power control command value of each wind turbine, which causes the total noise sound pressure level to be less than or equal to the noise threshold and output power of the whole wind farm to be maximum, based on the calculated output power of each wind turbine by using an optimization algorithm, and controls operation of each wind turbine based on the determined power control command value of each wind turbine.

For example, the control module 404 may calculate a maximum rotation speed of the wind turbine by the two-dimensional linear interpolation method based on the wind speed collected in a real-time manner and the first database (i.e., Table 2), and then calculate the output power of the wind turbine at a corresponding wind speed by the two-dimensional linear interpolation method by using the calculated maximum rotation speed and the corresponding wind speed in combination with the second database (i.e., Table 4). Here, the data calculation module 403 may also be used to calculate the output power at the corresponding wind speed.

The control module 404 inputs the calculated output power of each wind turbine as an initial value into the optimization algorithm, to find, by the optimization algorithm, a control solution by which the total noise sound pressure level does not exceed a limit (that is, less than or equal to the noise threshold) and the output power of the whole wind farm is the maximum, i.e., to find a power control command value of each wind turbine which causes the total noise sound pressure level to be less than or equal to the noise threshold and the output power of the whole wind farm to be the maximum. For example, the control module 404 may use a genetic algorithm or particle swarm optimization to find an optimal control solution with maximum output of the whole wind farm as a target and a noise limitation as the constraint. Then, the control module 404 sends the obtained power control command value of each wind turbine to a controller of a corresponding wind turbine, so that each wind turbine operates according to its corresponding power control command value.

Figure 5:
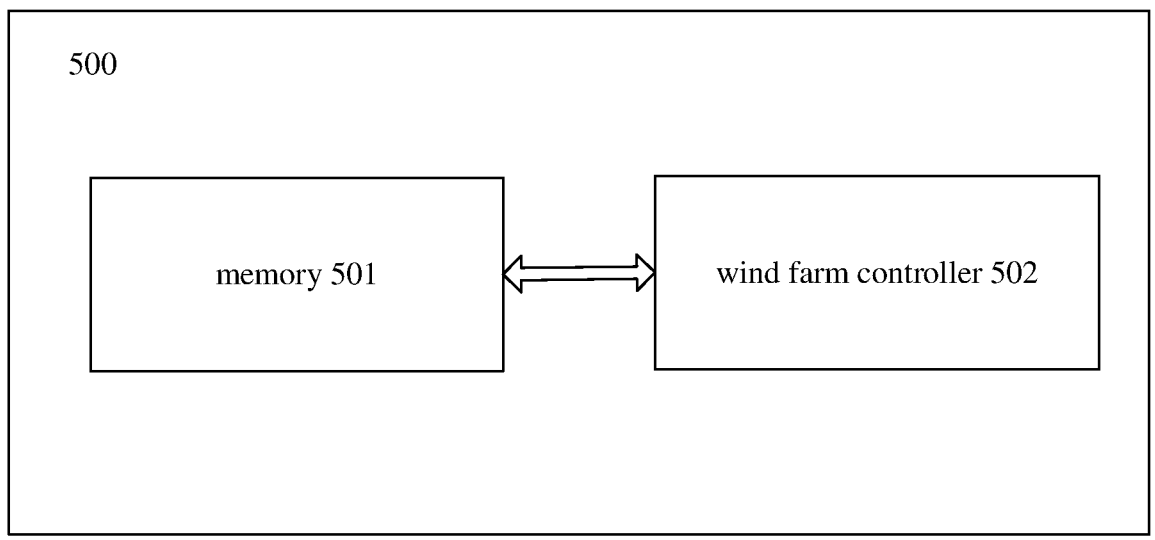
FIG. 5 illustrates a block diagram of a system for noise prediction of a wind farm according to an embodiment of the present disclosure.

FIG. 5 illustrates a block diagram of a system for noise prediction of wind farm according to an embodiment of the present disclosure.

As illustrated in FIG. 5, the system 500 for noise prediction of wind farm may include a memory 501 and a wind farm controller 502.

The memory 501 may store data of wind speed and wind direction of a wind turbine collected in a real-time manner, and location information of a noise detection point and the wind turbine.

In an embodiment of the present disclosure, first, at least one wind turbine in the wind farm expected to be predicted, which significantly affects noise at the noise detection point, is selected. Then a noise sound power level database and a wind turbine database are built based on noise sound power level data and output power data at different wind speeds and different rotation speeds of a wind turbine of the same type as the selected at least one wind turbine.

Offline files may be respectively formed by the built noise sound power level database and wind turbine database and stored on the memory 501. The noise sound power level database may include data of wind speed, rotation speed and noise sound power level, and the wind turbine database may include a first database including data of wind speed, maximum rotation speed and minimum rotation speed and a second database including data of wind speed, rotation speed and output power.

The wind farm controller 502 may calculate a noise sound power level of each wind turbine in the at least one wind turbine at a corresponding wind speed according to the noise sound power level database and the wind turbine database. Specifically, the wind farm controller 502 may calculate a maximum rotation speed of each selected wind turbine at a corresponding wind speed by a linear interpolation method according to the first database and the collected wind speed; and calculate the noise sound power level of each wind turbine at the corresponding wind speed by a linear interpolation method according to the calculated maximum rotation speed and the noise sound power level database.

In addition, in an embodiment of the present disclosure, a model of the wind farm can be built by simulation software (e.g., windpro). Then the built model of the wind farm is used to simulate a process of noise propagation of the wind farm, and a wind farm noise propagation database is built based on a simulation result. An offline file may be formed by the built wind farm noise propagation database and stored on the memory 501. The wind farm noise propagation database includes data of distance, angle and value of noise propagation loss.

The wind farm controller 502 may calculate a value of noise propagation loss of each selected wind turbine at the wind speed collected in a real-time manner according to the wind farm noise propagation database. Specifically, the wind farm controller 502 may calculate a straight-line distance between each wind turbine and the noise detection point according to the stored location information; calculate an angle between each wind turbine and the noise detection point according to the location information and a wind direction collected in real time; and calculate the value of noise propagation loss of each wind turbine at a corresponding wind speed by a linear interpolation method according to the wind farm noise propagation database, the calculated straight-line distance and the calculated angle.

After calculating the noise sound power level and the value of noise propagation loss of each selected wind turbine, the wind farm controller 502 may calculate a total noise sound pressure level at the noise detection point by using the noise sound power level and the value of noise propagation loss of all the at least one wind turbine. Specifically, the wind farm controller 502 may calculate, according to equation (1), a noise sound pressure level of each wind turbine at the noise detection point based on the calculated noise sound power level and calculated value of noise propagation loss of each selected wind turbine, and calculate the total noise sound pressure level at the noise detection point by superimposing, according to equation (2), the calculated noise pressure level of all the at least one wind turbine at the noise detection point.

In the present disclosure, the wind farm controller 502 may control output power of each wind turbine according to the calculated total noise sound pressure level at the noise detection point, so that output power of whole wind farm reaches maximum under the condition that the total noise sound pressure level does not exceed a noise threshold. Specifically, the wind farm controller 502 may compare the calculated total noise sound pressure level with the noise threshold at the noise detection point. In a case that the total noise sound pressure level is greater than the noise threshold, the wind farm controller 502 calculates output power of each wind turbine at the wind speed collected in a real-time manner based on the wind turbine database, determines a power control command value of each wind turbine, which causes the total noise sound pressure level to be less than or equal to the noise threshold and output power of the whole wind farm to be maximum, based on the calculated output power of each wind turbine by using an optimization algorithm, and controls operation of each wind turbine based on the determined power control command value of each wind turbine. For example, the calculated output power of each wind turbine may be input as an initial value into the optimization algorithm, to find, by the optimization algorithm, a control solution by which the total noise sound pressure level does not exceed a limit (that is, less than or equal to the noise threshold) and the output power of the whole wind farm is the maximum. For example, the optimization algorithm of the present disclosure may be particle swarm optimization or a genetic algorithm for implementing the above optimization process.

The wind farm controller 502 may send the obtained power control command value of each wind turbine to a controller of a corresponding wind turbine, so that each wind turbine operates according to a corresponding power control command value, to achieve the maximum power generation of the wind farm under the condition that the total noise sound pressure level does not exceed the limit.

The method for noise prediction of wind farm according to the embodiments of the present disclosure may be implemented as computer readable instructions that are recorded on a computer readable storage medium or may be sent through a transmission medium. The computer readable storage medium may be any kind of data storage devices storing data that can be read by a computer system. Examples of the computer readable memory medium may include, but are not limited to, a Read-Only Memory (ROM), a Random Access Memory (RAM), an optical disk (CD-ROM), a digital versatile disk (DVD), a magnetic tape, a floppy disk, and an optical data storage device. The transmission medium may include carrier waves transmitted over a network or through various types of communication channels. The computer readable storage medium may also be distributed to computer systems connected to the network so that computer readable instructions are stored and executed in a distributed manner.

Although the present disclosure is described with reference to exemplary embodiments of the present disclosure, the person skilled in the art will understand that various changes can be made to the embodiments in forms and details without departing from the spirit and scope of this disclosure as defined by the claims.

The invention claimed is:

1. A method for noise prediction of a wind farm, comprising:
   collecting, in a real-time manner, one or more wind speeds at one or more locations of one or more wind turbines in the wind farm, wherein the one or more wind turbines have an impact on noise at a noise detection point;
   calculating a noise sound power level of each of the one or more wind turbines at a corresponding collected wind speed of each of the one or more wind turbines according to a noise sound power level database and a wind turbine database, comprising:
      calculating a maximum rotation speed of each of the one or more wind turbines at the corresponding collected wind speed by a first linear interpolation method according to the wind turbine database and the corresponding collected wind speed; and
      calculating the noise sound power level of each of the one or more wind turbines at the corresponding collected wind speed by a second linear interpolation method according to the calculated maximum rotation speed and the noise sound power level database;
   calculating a value of noise propagation loss of each of the one or more wind turbines at the corresponding collected wind speed according to a wind farm noise propagation database; and
   calculating a total noise sound pressure level at the noise detection point by using the noise sound power level and the value of noise propagation loss of each of the one or more wind turbines.

2. The method according to claim 1, wherein the noise sound power level database comprises data of wind speeds, rotation speeds and noise sound power levels, the wind turbine database comprises a first database including data of the wind speeds, maximum rotation speeds and minimum rotation speeds, and the wind turbine database further comprises a second database including data of the wind speeds, the rotation speeds and output power.

3. The method according to claim 1, wherein the wind farm noise propagation database is built at least by:
   building a model of the wind farm;
   simulating a process of noise propagation of the wind faint by using the built model of the wind farm; and
   building the wind farm noise propagation database according to a result of the simulation,
   wherein the wind farm noise propagation database comprises data of distances, angles and values of noise propagation loss.

4. The method according to claim 2, wherein calculating the maximum rotation speed of each of the one or more wind turbines at the corresponding collected wind speed comprises:
   calculating the maximum rotation speed of each of the one or more wind turbines at the corresponding collected wind speed by the first linear interpolation method according to the first database and the corresponding collected wind speed.

5. The method according to claim 1, wherein calculating the value of noise propagation loss of each of the one or more wind turbines at the corresponding collected wind speed comprises:
   obtaining location information of each of the one or more wind turbines and the noise detection point;
   calculating a straight-line distance between each of the one or more wind turbines and the noise detection point according to the obtained location information;
   calculating an angle between each of the one or more wind turbines and the noise detection point according to the obtained location information and a wind direction collected in real time at the location of each of the one or more wind turbines; and
   calculating the value of noise propagation loss of each of the one or more wind turbines at the corresponding collected wind speed by the second linear interpolation method according to the wind farm noise propagation database, the calculated straight-line distance and the calculated angle.

6. The method according to claim 1, wherein calculating the total noise sound pressure level at the noise detection point comprises:
   calculating a noise sound pressure level of each of the one or more wind turbines at the noise detection point by using the noise sound power level and the value of noise propagation loss of each of the one or more wind turbines; and
   calculating the total noise sound pressure level at the noise detection point by superimposing the calculated noise pressure level of each of the one or more wind turbines at the noise detection point.

7. The method according to claim 1, further comprising:
controlling output power of each of the one or more wind turbines according to the calculated total noise sound pressure level at the noise detection point, whereby output power of the wind farm reaches a maximum under a condition that the total noise sound pressure level does not exceed a noise threshold.

8. The method according to claim 7, wherein controlling the output power of each of the one or more wind turbines according to the calculated total noise sound pressure level at the noise detection point comprises:
comparing the calculated total noise sound pressure level with the noise threshold;
calculating, responsive to the total noise sound pressure level being greater than the noise threshold, the output power of each of the one or more wind turbines at the corresponding collected wind speed based on the wind turbine database;
determining, by using an optimization algorithm, a power control command value of each of the one or more wind turbines based on the calculated output power of each of the one or more wind turbines, wherein the power control command value causes the total noise sound pressure level to be less than or equal to the noise threshold and the output power of the wind farm to be the maximum; and
controlling an operation of each of the one or more wind turbines based on the determined power control command value of each of the one or more wind turbines.

9. The method according to claim 1, wherein the noise sound power level database and the wind turbine database are built based on noise sound power level data and output power data of a wind turbine of the same type as the one or more wind turbines at different wind speeds and different rotation speeds.

10. A system for noise prediction of a wind farm, comprising:
a memory configured to store one or more wind speeds collected in a real-time manner at one or more locations of one or more wind turbines in the wind farm, a noise sound power level database and a wind turbine database, wherein the one or more wind turbines have an impact on noise at a noise detection point; and
a wind farm controller configured to:
calculate a noise sound power level of each of the one or more wind turbines at a corresponding collected wind speed of each of the one or more wind turbines according to the noise sound power level database and the wind turbine database;
calculate a value of noise propagation loss of each of the one or more wind turbines at the corresponding collected wind speed according to a wind farm noise propagation database; and
calculate a total noise sound pressure level at the noise detection point by using the noise sound power level and the value of noise propagation loss of each of the one or more wind turbines,
wherein to calculate the noise sound power level of each of the one or more wind turbines at the corresponding collected wind speed, the wind farm controller is further configured to:
calculate a maximum rotation speed of each of the one or more wind turbines at the corresponding collected wind speed by a first linear interpolation method according to the wind turbine database and the corresponding collected wind speed; and
calculate the noise sound power level of each of the one or more wind turbines at the corresponding collected wind speed by a second linear interpolation method according to the calculated maximum rotation speed and the noise sound power level database.

11. The system according to claim 10, wherein the noise sound power level database comprises data of winder speeds, rotation speeds and noise sound power levels, the wind turbine database comprises a first database including data of the wind speeds, maximum rotation speeds and minimum rotation speeds, and the wind turbine database further comprises a second database including data of the wind speeds, the rotation speeds and output power.

12. The system according to claim 10, wherein:
the wind farm noise propagation database is built according to a result of simulating a process of noise propagation of the wind farm; and
the wind farm noise propagation database comprises data of distances, angles and values of noise propagation loss.

13. The system according to claim 11, wherein to calculate the maximum rotation speed of each of the one or more wind turbines at the corresponding collected wind speed, the wind farm controller is further configured to:
calculate the maximum rotation speed of each of the one or more wind turbines at the corresponding collected wind speed by the first linear interpolation method according to the first database and the corresponding collected wind speed.

14. The system according to claim 10, wherein the memory is further configured to store location information of each of the one or more wind turbines and the noise detection point and a wind direction collected in real time at the location of each of the one or more wind turbines, and
the wind farm controller is further configured to calculate a straight-line distance between each of the one or more wind turbines and the noise detection point according to the obtained location information, calculate an angle between each of the one or more wind turbines and the noise detection point according to the obtained location information and the collected wind direction, and calculate the value of noise propagation loss of each of the one or more wind turbines at the corresponding collected wind speed by the second linear interpolation method according to the wind farm noise propagation database, the calculated straight-line distance and the calculated angle.

15. The system according to claim 10, wherein the wind farm controller is further configured to:
calculate a noise sound pressure level of each of the one or more wind turbines at the noise detection point by using the noise sound power level and the value of noise propagation loss of each of the one or more wind turbines; and
calculate the total noise sound pressure level at the noise detection point by superimposing the calculated noise pressure level of each of the one or more wind turbines at the noise detection point.

16. The system according to claim 10, wherein the wind farm controller is further configured to:
control output power of each of the one or more wind turbines according to the calculated total noise sound pressure level at the noise detection point, whereby output power of the wind farm reaches a maximum under a condition that the total noise sound pressure level does not exceed a noise threshold.

17. The system according to claim 16, wherein the wind farm controller is further configured to:
- compare the calculated total noise sound pressure level with the noise threshold;
- calculate, responsive to the total noise sound pressure level being greater than the noise threshold, output power of each of the one or more wind turbines at the corresponding collected wind speed based on the wind turbine database;
- determine, by using an optimization algorithm, a power control command value of each of the one or more wind turbines based on the calculated output power of each of the one or more wind turbines, wherein the power control command value causes the total noise sound pressure level to be less than or equal to the noise threshold and the output power of the wind farm to be the maximum; and
- control an operation of each of the one or more wind turbines based on the determined power control command value of each of the one or more wind turbines.

18. The system according to claim 10, wherein the noise sound power level database and the wind turbine database are built based on noise sound power level data and output power data of a wind turbine of the same type as the one or more wind turbines at different wind speeds and different rotation speeds.

19. A non-transitory computer readable storage medium with a program stored thereon; wherein the program comprises instructions for performing a method for noise prediction of a wind farm, the method comprising:
- collecting, in a real-time manner, one or more wind speeds at one or more locations of one or more wind turbines in the wind farm, wherein the one or more wind turbines have an impact on noise at a noise detection point;
- calculating a noise sound power level of each of the one or more wind turbines at a corresponding collected wind speed of each of the one or more wind turbines according to a noise sound power level database and a wind turbine database, comprising:
  - calculating a maximum rotation speed of each of the one or more wind turbines at the corresponding collected wind speed by a first linear interpolation method according to the wind turbine database and the corresponding collected wind speed; and
  - calculating the noise sound power level of each of the one or more wind turbines at the corresponding collected wind speed by a second linear interpolation method according to the calculated maximum rotation speed and the noise sound power level database;
- calculating a value of noise propagation loss of each of the one or more wind turbines at the corresponding collected wind speed according to a wind farm noise propagation database; and
- calculating a total noise sound pressure level at the noise detection point by using the noise sound power level and the value of noise propagation loss of each of the one or more wind turbines.

20. The storage medium according to claim 19, wherein the noise sound power level database and the wind turbine database are built based on noise sound power level data and output power data of a wind turbine of the same type as the one or more wind turbines at different wind speeds and different rotation speeds.

* * * * *